US007266239B2

(12) United States Patent
Akiyama et al.

(10) Patent No.: US 7,266,239 B2
(45) Date of Patent: Sep. 4, 2007

(54) METHOD AND APPARATUS FOR PROCESSING IMAGE DATA, STORAGE MEDIUM AND PROGRAM

(75) Inventors: Yuji Akiyama, Kanagawa (JP);
Naohisa Suzuki, Kanagawa (JP);
Makoto Torigoe, Tokyo (JP); Shigeru Mizoguchi, Kanagawa (JP); Manabu Yamazoe, Tokyo (JP); Ryosuke Iguchi, Kanagawa (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 10/235,758

(22) Filed: Sep. 6, 2002

(65) Prior Publication Data
US 2003/0052894 A1 Mar. 20, 2003

(30) Foreign Application Priority Data
Sep. 12, 2001 (JP) ............................. 2001-276443

(51) Int. Cl.
*G06K 9/00* (2006.01)
*G06F 13/00* (2006.01)
(52) U.S. Cl. .................................................... 382/167
(58) Field of Classification Search ................ 382/162, 382/164, 167, 276; 345/600, 603; 358/1.9, 358/504, 515, 518; 348/745
See application file for complete search history.

(56) References Cited

U.S. PATENT DOCUMENTS

| 5,349,452 | A | | 9/1994 | Maeda et al. ................ 358/527 |
| 5,481,380 | A | * | 1/1996 | Bestmann ..................... 358/504 |
| 5,502,580 | A | * | 3/1996 | Yoda et al. ................... 358/518 |
| 5,528,339 | A | * | 6/1996 | Buhr et al. ..................... 355/32 |
| 5,572,235 | A | * | 11/1996 | Mical et al. .................. 345/600 |
| 5,729,664 | A | | 3/1998 | Ishikawa ....................... 358/1.9 |
| 5,748,858 | A | * | 5/1998 | Ohtsuka et al. ............... 358/1.9 |
| 5,787,193 | A | * | 7/1998 | Balasubramanian ......... 382/167 |
| 5,982,949 | A | * | 11/1999 | Ohtsuka ....................... 382/276 |
| 6,147,772 | A | | 11/2000 | Pritchett ....................... 358/1.9 |
| 6,437,792 | B1 | * | 8/2002 | Ito et al. ....................... 345/600 |
| 2001/0038468 | A1 | | 11/2001 | Hiratsuka .................... 358/518 |
| 2002/0063807 | A1 | * | 5/2002 | Margulis ...................... 348/745 |

FOREIGN PATENT DOCUMENTS

EP 0 703 701 A2 3/1996

(Continued)

OTHER PUBLICATIONS

"Proposal For a Standard Default Color Space For The Internet -SRGB", Matthew Anderson et al., Final Program And Proceedings Of The IS&T/SID Color Imaging Conference: Color Science, Systems, and Applications, 1996, pp. 238-246 XP000950019.

*Primary Examiner*—Amir Alavi
(74) *Attorney, Agent, or Firm*—Fitzpatrick, Cella, Harper & Scinto

(57) ABSTRACT

In outputting of image data, the image data is converted into color space data suitable for outputting means, and thereby a color reproducing capability of the outputting means is utilized. Thus, the image data is read, the image data is converted into first color space data, the image data is converted into second color space data, the first color space data is outputted to first outputting means, and the second color space data is outputted to second outputting means.

15 Claims, 6 Drawing Sheets

FOREIGN PATENT DOCUMENTS

| | | |
|---|---|---|
| EP | 0 786 896 A2 | 7/1997 |
| EP | 0 991 020 A2 | 4/2000 |
| JP | 6-233127 | 8/1994 |
| JP | 8-056292 | 2/1996 |
| JP | 10-126636 | 5/1998 |
| JP | 11-331622 | 11/1999 |
| JP | 2000-069306 | 3/2000 |
| JP | 200-152279 A | 5/2000 |
| JP | 2001-45309 A | 2/2001 |
| JP | 2001-157069 | 6/2001 |
| WO | WO 01/17233 A1 | 3/2001 |

* cited by examiner

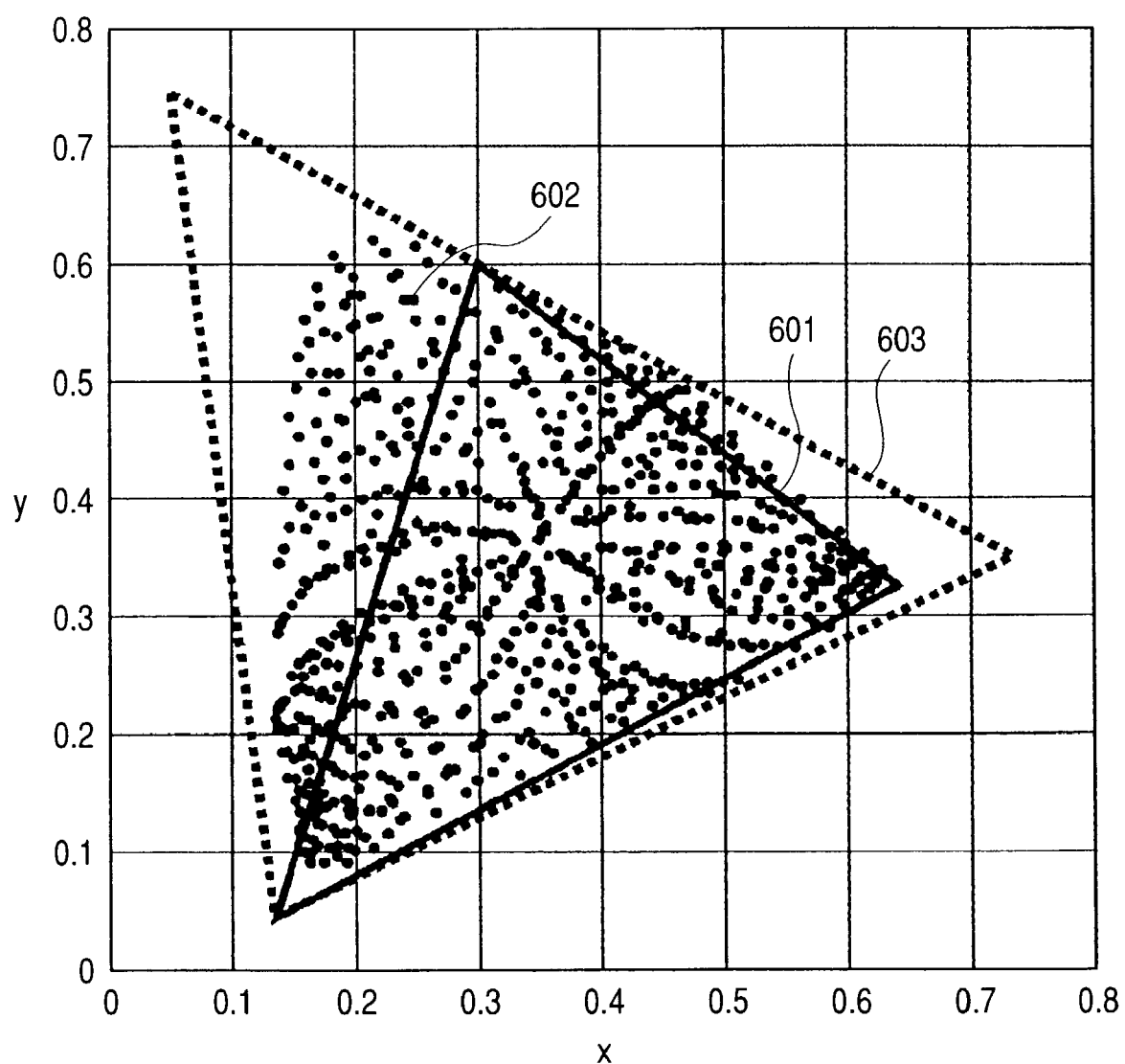

METHOD AND APPARATUS FOR PROCESSING IMAGE DATA, STORAGE MEDIUM AND PROGRAM

BACKGROUND OF THE INVENTION

1. Field of the Invention

The present invention relates to a method and an apparatus for processing image data, a storage medium and a program, which are designed to convert digital image data obtained by an input device such as a digital still camera into optimal image data to be displayed on a display, or printed by a printer.

2. Description of the Related Art

With improved performance and popularization of an input device such as a digital still camera in recent years, digitization of a photographic image has become easier, increasing chances of treating photographic images as digital data especially on personal computers. Moreover, the photographic images can now be processed and edited by using a variety of application software on such personal computers.

On the other hand, a full-color hardcopy technology has been rapidly developed. Especially, in a printing technology based on an ink jet system, by a technology for reducing a granulation state of ink dots, a quality of a printed image has been becoming equal to that of a silver salt photograph, and its relatively simple printing method has come into wide use.

Image data fetched by the input device such as a digital still camera are recorded in various signal forms and formats by predetermined storing means.

In the case of the digital still camera, most images are recorded in JPEG formats, and the images are stored in forms of luminance and color-difference data (YCbCr data).

A generally used data form is RGB data, and a relation between the RGB data and the YCbCr data is represented by the following equations compliant with ITU-R BT. 601.

$$Y=0.299 \times R+0.587 \times G+0.114 \times B$$

$$Cb=(-0.299 \times R-0.587 \times G+0.886 \times B) \times 0.564+k$$

$$Cr=(0.701 \times R-0.587 \times G-0.114 \times B) \times 0.564+k \quad \text{(Equation 1-1)}$$

$$R=Y+((Cr-k) \times 1.4020)$$

$$G=Y-((Cb-k) \times 0.3441)-((Cr-k) \times 0.7139)$$

$$B=Y+((Cb-k) \times 1.7718) \quad \text{(Equation 1-2)}$$

Here, Cb and Cr take positive and negative values, and the RGB data is generally processed with 8 bits for each color. Accordingly, in the case of calculation based on 8 bits, R, G and B take 0 to 255 values, and a value of k is 128.

Further, in the case of conversion from the YCbCr data to the RGB data, R, G and B data may take values other than 0 to 255. Thus, saturation processing is carried out to clip a value equal to/lower than 0 to 0, and a value equal to/higher than 255 to 255.

Therefore, in displaying of image data on a display device such as a CRT monitor, only colors represented by data having RGB color values set in the range of 0 to 255 are reproduced.

As color space used for color matching, sRGB color space (IEC 61966-2-1, and ITU-R BT. 709) is available. This sRGB color space is defined buy considering a characteristic of the CRT monitor.

Unification of colors among devices has promoted use the sRGB color space as standard color space of a versatile operation system used on the personal computer. Thus, RGB color values of 0 to 255 have generally been treated as sRGB color space date recently.

However, in a real scene, a color reproducing area is naturally larger than that of the display device such as a CRT monitor. Depending on a part of the color space, a color reproducing area on a printer device may be larger than that on the display device such as a CRT monitor.

FIG. 6 is a chromaticity view showing color reproduction. A reference numeral 601 denotes sRGB color space, and 602 an optional color point to be reproduced.

The sRGB color space frequently used as standard color space is not always included completely within a color reproducing range of an input/output device. As can be understood from FIG. 6, if processing is carried out as sRGB data, a color area to be reproduced by the printer is omitted.

In the digital still camera, a color signal obtained by a sensor is mapped on sRGB space by predetermined processing, and converted into YcrCb data. However, in order to improve color reproducibility other than on the sRGB display device, a value of sRGB data may be equivalently expanded to a value of 0 or lower, or a value of 255 or higher. In this case, a largest color area is decided by limitation ($0 \leq Y \leq 255$, and $-128 \leq CbCr \leq 127$) of an 8-bit YCbCr signal. A color reproducing area may be expanded to this range.

As described above, when Y, Cb and Cr image data used in the JPEG formats are converted into sRGB color space, a color to be reproduced by the printer may be omitted. In the case of an output to the display device such as a CRT monitor, only its color reproducing area can be reproduced originally. Accordingly, a good image without any defects seems to be reproduced. However, in the case of a printed output by the printer, because of omission of information regarding a color contained in an original image, correct color reproduction true to the original image cannot be achieved.

On the other hand, if image data is processed by using expanded color space 603 of FIG. 6, which completely includes the color reproducing range of the printer, correct displaying cannot be carried out in the case of an output to the display device such as a CRT monitor.

The present invention was made with the foregoing problems in mind, and objects of the invention are to provide a method and an apparatus for processing image data, a storage medium and a program, which can output image data after conversion into color space data suitable for outputting means when the image data is outputted.

Objects of the present invention are to provide a method and an apparatus for processing image data, a storage medium and a program, which can achieve conversion into image data suitable for both of a display and a printer.

Further objects of the present invention are to provide a method and an apparatus for processing image data, a storage medium and a program, which can achieve conversion into image data of a proper color reproducing area by analyzing information added to an image file.

SUMMARY OF THE INVENTION

In order to achieve the foregoing objects, a feature of the present invention is that image data is read, the image data is converted into first color space data, the image data is converted into second color space data, the first color space data is outputted to first outputting means, and the second color space data is outputted to second outputting means.

Other features of the invention will become apparent upon reading of the following preferred embodiments.

BRIEF DESCRIPTION OF THE DRAWINGS

FIG. 6 is a view showing color reproduction.

DETAILED DESCRIPTION OF THE PREFERRED EMBODIMENTS

Next, detailed description will be made of the preferred embodiments of the present invention with reference to the accompanying drawings.

(First Embodiment)

Figure 1:
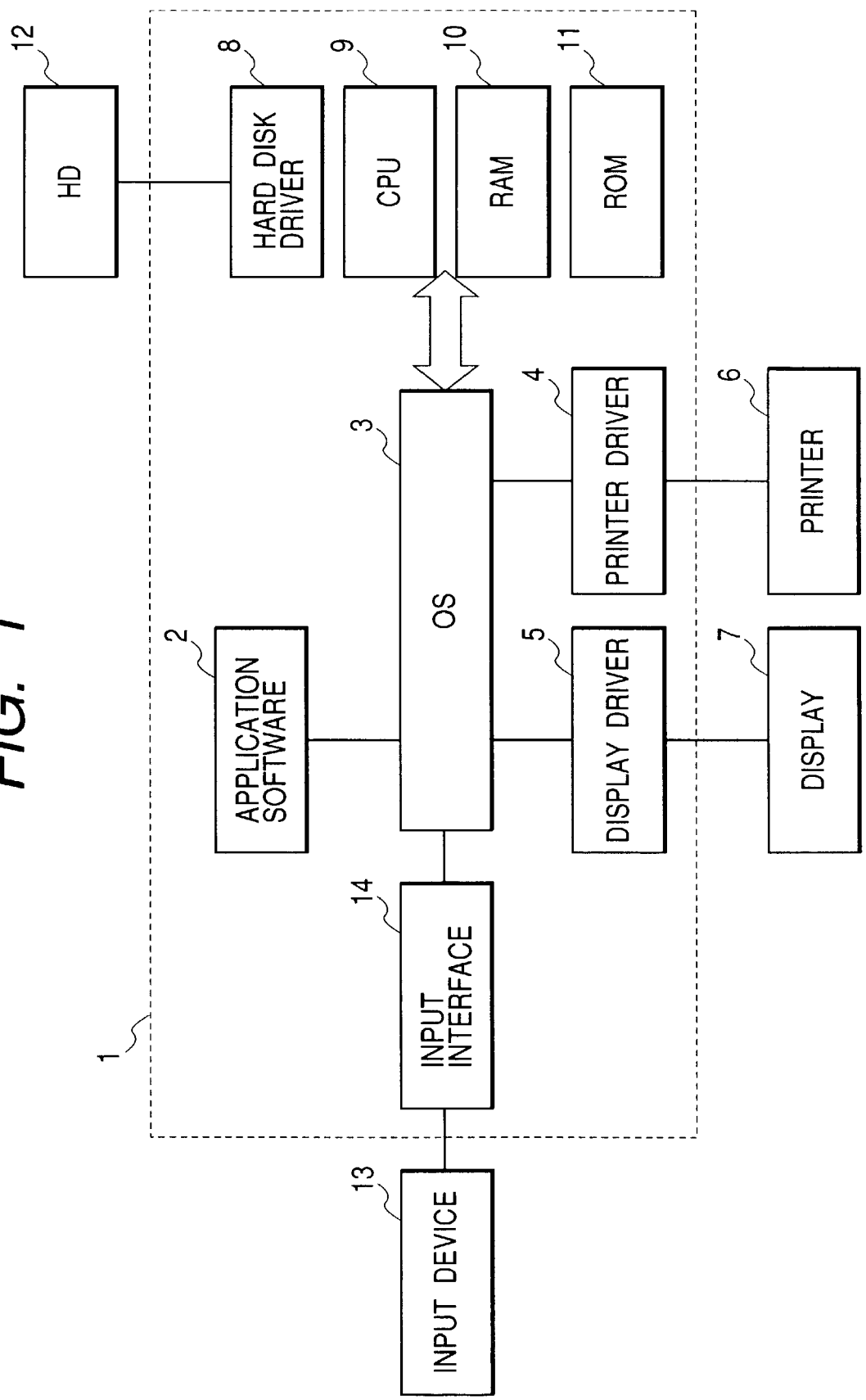
FIG. 1 is a block diagram showing a schematic configuration of a system according to a first embodiment of the present invention.

FIG. 1 is a block diagram showing a schematic configuration of a system according to a first embodiment of the invention.

The system schematically comprises a host computer 1, a printer 6 and a display 7. That is, the ink jet printer 6 and the display 7 are connected to the host computer 1 so as to execute two-way communications.

The host computer 1 includes an operating system (OS) 3. The host computer 1 also includes application software 2 for photo-retouching, laying-out or the like, and a printer driver 4 for creating printing data by processing a group of various drawing commands (image drawing command, test drawing command, and graphic drawing command) indicating output images, issued by the application software, which execute respective processing operations under control of the OS 3. Further, the host computer 1 includes a display driver 5 similarly provided as software to execute displaying on the display 7 by processing the group of various drawing commands issued by the application software 2.

Also, the host computer 1 includes a central processing unit (CPU) 9, a hard disk driver 8, a random access memory (RAM) 10, a read-only-memory (ROM) 11, an input interface 14 and the like as various hardware equipments to be operated by the above-described software. The CPU 9 executes signal processing related to processing of the software. A hard disk (HD) 12 driven by the hard disk driver 8 contains image data photographed by, for example a digital sill camera, and the software. The ROM 11 similarly pre-stores the software, which is read out and used when necessary. The RAM 10 is used s a work area or the like for the signal processing execution of the CPU 9. An input through an input device 13 such as a mouse or a keyboard is entered through the input interface 14, and subjected processing by the OS 3.

Transfer of image data from an image input device such as a digital still camera or the like to the hard disk (HD) 12 of the host computer 1 can be carried out through the input interface 14 by a reader of a memory disk or a memory card, cable connection, infrared data communication or radio communication. Needless to say, without moving the image data to the hard disk (HD) 12 of the host computer 1, it is possible to execute processing by connecting the digital still camera to the host computer 1 through a cable, infrared data communication or radio communication, and directly reading the image data from the memory car or the built-in memory held by the image input device such as a digital still camera.

In the system thus constructed, based on the image displayed on the display 6 by the application software 2, a user can create image data composed of text data classified as a text of a character or the like, graphics data classified as graphics, images data classified as a photographic image photographed by digital still camera or the like, and so on, similarly through application processing.

When the user instructs printing output of the created image data, the application software 2 requests the printing output to the OS 3, and issues a group of drawing commands indicating an output image to the OS 3, the command group including a graphics drawing command for a graphics data part, and an image drawing command for an image data part. Upon reception of the printing output request from the application software 2, the OS 3 issues a group of drawing command to the printer driver 4 corresponding to the printer 6 for executing printing. Here, generally, 8-bit data is frequently used for the image drawing command.

The printer driver 4 processes the printing request and the group of drawing commands entered from the OS 3, create printing data in a form to be printed by the printer 6, and transfer the printing data to the printer 6. In this case, if the printer 6 is a raster printer, the printer driver 4 executes image correction processing sequentially for the drawing commands from the OS 3, and rasterizes the corrected drawing commands sequentially in an RGB 24-bit page memory (8 bits of each of R, G and B). After the rasterization of all the drawing commands, the printer driver 4 converts a content of the RGB 24-bit page memory into a data form, e.g., CMYK data, to be printed by the printer 6, and then transfers it to the printer.

For displaying on the display 7, similarly, the OS 3 issues a group of drawing command to the display driver 5. The display driver 5 converts the group of drawing commands into a data form to be displayed on the display 7, and transfers the data to the display.

Figure 2:
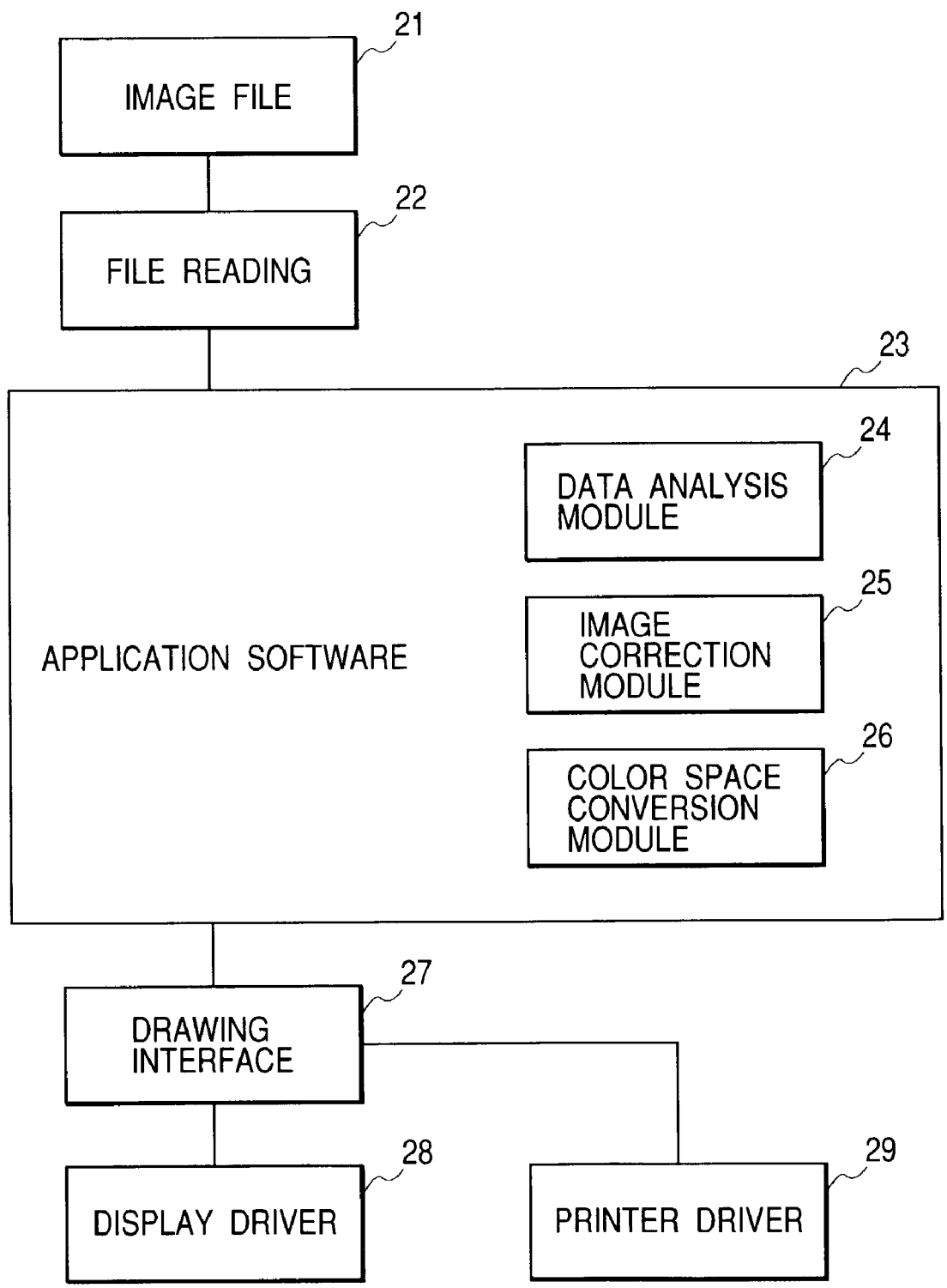
FIG. 2 is a block diagram schematically showing application software of the first embodiment of the invention.
Figure 3:
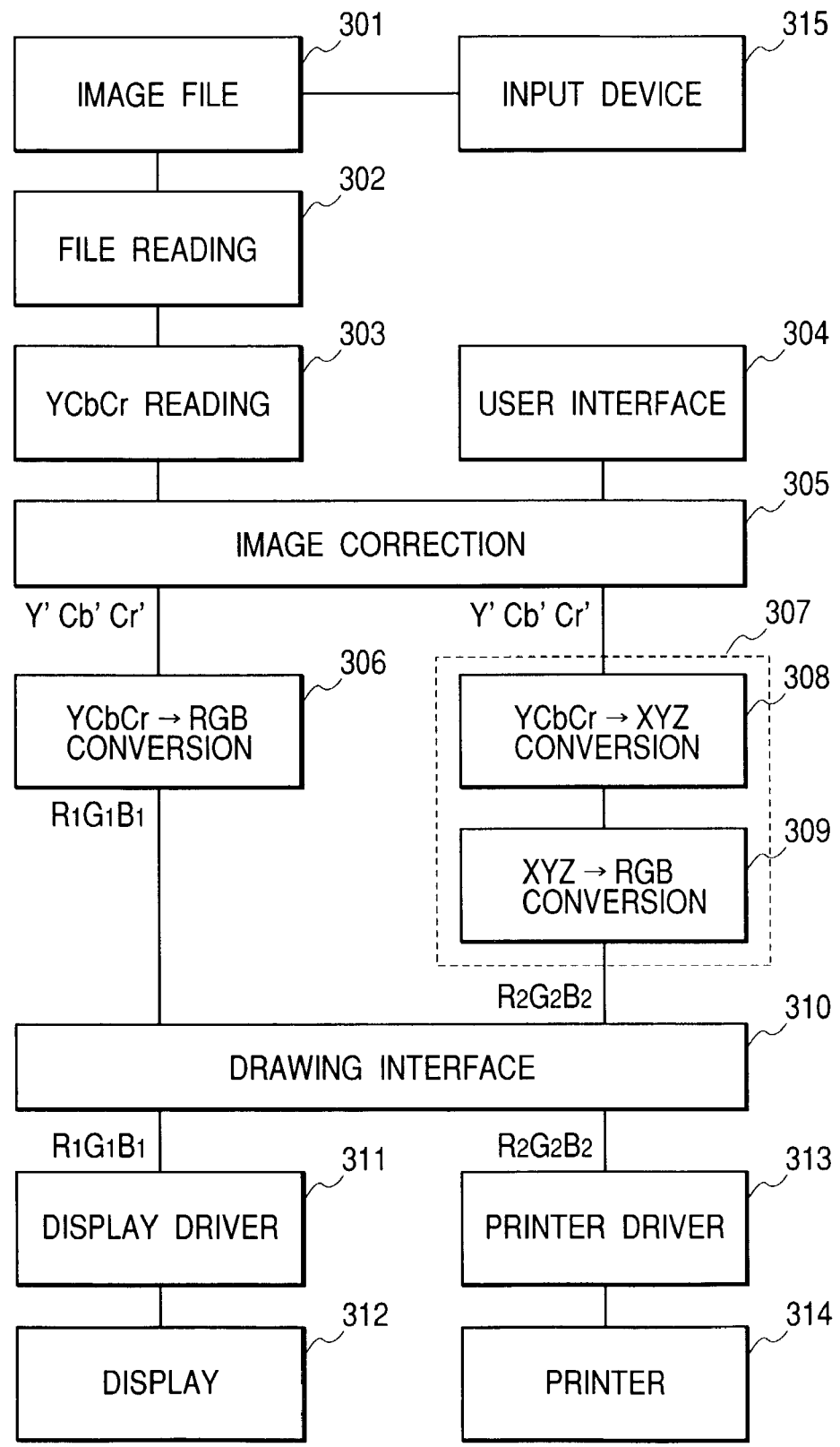
FIG. 3 is a block diagram schematically showing image data processing of the first embodiment of the invention.

FIG. 2 is a block diagram schematically showing the application software of the first embodiment of the invention; and FIG. 3 a block diagram schematically showing image data processing of the first embodiment of the invention.

An image file 301 such as EXIT containing image data recorded by an input device 315 such as a digital still camera is read by a file reading unit 302.

This reading can be carried out through the input interface by a reader of a memory disk or a memory card, cable connection, infrared data communication or radio communication, by way of the host computer. Needless to say, it is possible to execute processing by connecting the input device such as a digital still camera to the host computer through cable connection, infrared data communication or radio communication, and directly reading the image file from the memory card or the built-in memory held by the input device such as a digital still camera.

Application software 23 includes a data analysis module 23, an image correction module 25, and a color space conversion module 26.

The image data are recorded in various formats and forms, and may be recorded by being compressed so as to reduce a volume of data. The data analysis module 24 includes a function of analyzing presence of compression corresponding to setting in the input device during photographing of the image, and information of a compressing method, regarding information added to the image file. The data analysis module 24 analyzes such a data form, executes decompression processing for the compressed data corresponding to the compressing method based on the analysis, and thereby obtains desired image data.

In the image correction module 25, correction processing such as brightness, contrast, color balance or the like is carried out so as to obtain optimal output result when outputs are made at the display and the printer of the rear stage.

The color space conversion module 26 converts the image data obtained by the data analysis module 24 into image data corresponding to color space of the output device.

The image data having been processed and converted by the application software 23 is sent through a drawing interface 27 to a display driver 28 and a printer driver 29.

Here, processing capable of reading YCbCr data as image data is described.

The image file 301 containing the image data recorded by the input device 315 such as a digital still camera is read by the file reading unit 302.

Luminance and color-difference data (YCbCr data) read a YCbCr reading unit 303 is subjected to correction processing for brightness, contract, color balance or the like at an image correction processing unit 305, and converted into Y'Cb'Cr' data. A content of the correction processing is designated through a user interface 304. By carrying out image correction in a state of the YCbCr data, it is possible to make correction for correct color reproducing information of original image data without any effects of data omission occurring in correction after conversion into RGB data.

The Y'Cb'Cr' data having been subjected to the image correction is converted into R1G1B1 data at a YCbCr→RGB converting unit 306. The conversion into the R1G1B1 data is carried out based on the previous equation (1-2). Since the RGB data is treated as 8-bit data for each color, saturation processing is carried out to clip a value of 0 or lower to 0, and a value of 255 or higher to 255.

Color space of the converted R1G1B1 data is treated as sRGB color space.

On the other hand, the Y'Cb'Cr' data is first converted into a predetermined XYZ value at a YCbCr→XYZ converting unit 308 at a color space converting unit 307, and then converted into R2G2B2 data of 8 bits for each color at an XYZ→RGB converting unit 309.

Here, lookup tables are respectively created from color reproducing characteristics of the used input device 315 (digital still camera in the embodiment) for the conversion from the YCbCr data into the XYZ data, and the used printer for the conversion from the XYZ data into the RGB data. Then, each conversion is carried out by interpolation processing.

Thus, because of no execution of the saturation processing, color space of the R2G2B2 data is treated as expanded color space data (larger color reproducing area) capable of representing more colors than that of the sRGB color space.

In the described conversion, by treating R2, G2 and B2 as 16-bit data (equation 1-2), values from −32768 to 32768 can be taken when the YCbCr data is converted into the RGB data. An XYZ value may be obtained from sRGB data expanded according to definition of e-sRGB (PIMA 7667), and converted into R2G2B2 data as expanded color space data by using a predetermined lookup table.

The converted R1G1B1 data is sent through a drawing interface 310 to a display driver 311, and displayed on a display 312.

On the other hand, the R2G2B2 data is sent through the drawing interface 310 to the printer driver, and printed and outputted from the printer 314.

By the above-described conversion, by using the R1G1B1 as the sRGB color space data for the display 312, and the R2G2B2 as the expanded color space data including a sufficient printer color reproducing area for the printer 314, image data can be used, which are suitable for the respective devices. A color characteristic of the original image can be outputted and reproduced by achieving good image displaying on the display and preventing any color omission in the printer.

The invention is not limited to the foregoing embodiment, and various changed and modifications can be made without departing from the teachings.

For system configuration, a data processing function may be provided in the printer, and the foregoing data processing may be carried out in the printer, thereby eliminating the use of the personal computer. In this case, image data can be read through a memory card from a reader such as a card reader provided in the printer, or from the memory card or the built-in memory held by the input device such as a digital camera by connecting the input device such as a digital still camera to the printer through a cable, infrared data communication or radio communication.

If a simple liquid crystal monitor is mounted as a display on the printer while the data processing function is provided in the printer, for the foregoing processed image data, data used for displaying on the liquid crystal monitor and data used for printing can be treated as separate color space data (sRGB color space, and expanded color space).

The embodiment has been described by way of example, where the digital still camera is used as the input device. However, the embodiment is not limited to the digital still camera. For example, the embodiment can be applied to an input device such as a digital video camera, an image scanner, or s film scanner.

According to the embodiment, in outputting of image data, the image data is converted into color space data suitable for each of the plurality of output devices, and then the image data can be outputted. Especially, in the printer having a larger color reproducing area than the display, image outputting effectively using its color reproducing area can be carried out.

(Second Embodiment)

Now, a second embodiment will be described by referring to a content of processing capable of reading both RGB and YCbCr data as image data from an input device.

Figure 4:
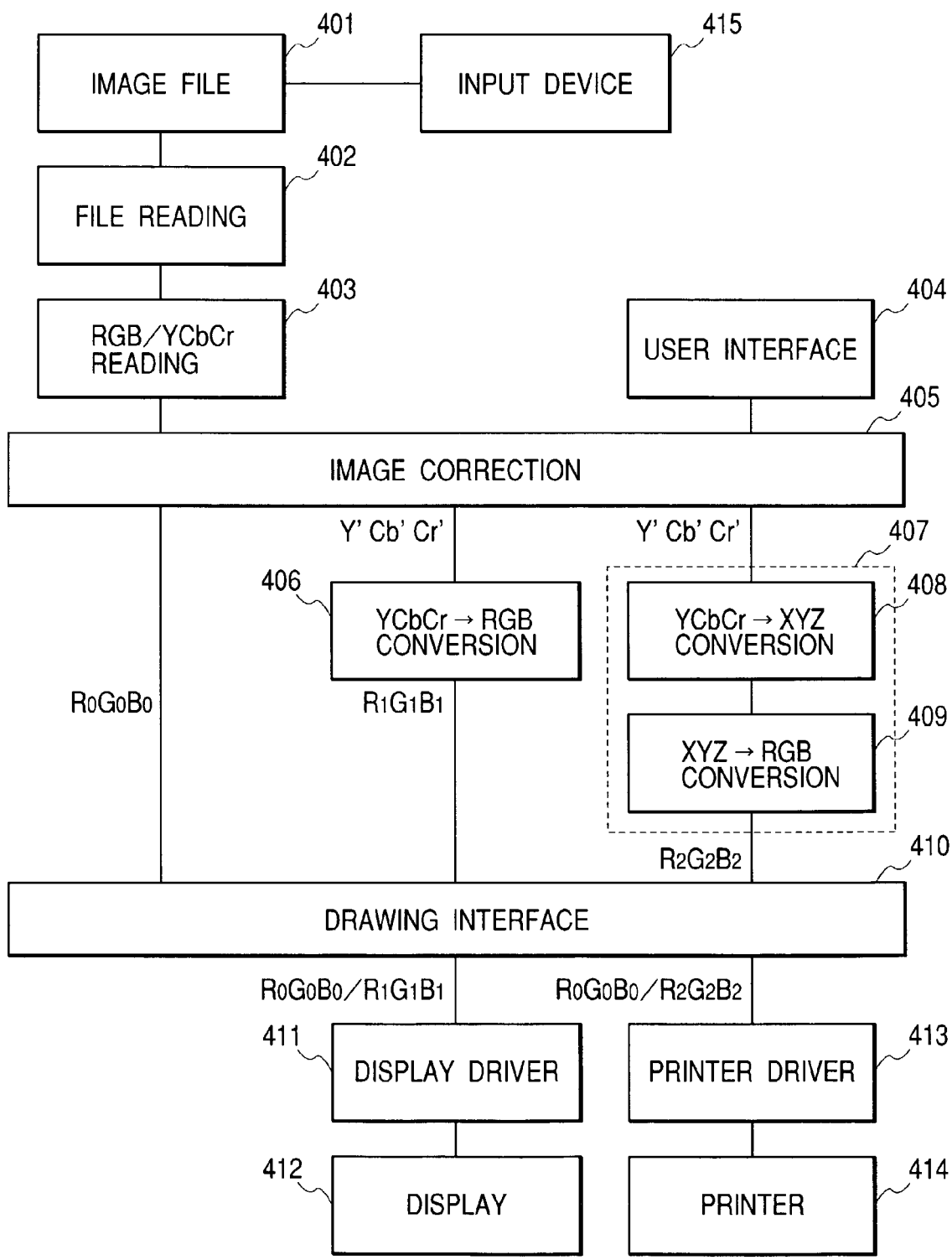
FIG. 4 is a block diagram schematically showing image data processing according to a second embodiment of the invention.

FIG. 4 is a block diagram schematically showing image data processing according to the second embodiment.

An image file 401 containing image data recorded by an input device 415 such as a digital still camera is read by a file reading unit 402. As in the case of the first embodiment, a data analysis module 24 analyzes information added to the image file. Among the added information, information indicating color space of an image stored in the image file is analyzed to determine whether the color space of the image is RGB color space or YCbCr color space. Alternatively, by using information indicating a maker of the input device 415 and information indicating a model name of the input device among the added information, color space of an image entered by each model may be specified.

If a result of the analysis by the data analysis module 24 shows that data read by an RGB/YCbCr reading unit 403 is luminance and color-difference data (YCbCr data), the data is subjected to correction processing for brightness, contrast, color balance or the like at an image correction processing unit 405, and converted into Y'Cb'Cr' data. A content of the correction processing is instructed through a user interface 404. By carrying out image correction in a state of the YCbCr data, it is possible to make correction for correct color reproducing information of original image data without any effects of data omission occurring in correction after conversion into RGB data.

The Y'Cb'Cr' data having been subjected to the image correction is converted into R1G1B1 data at a YCbCr→RGB converting unit 406. The conversion into the R1G1B1 data is carried out based on the previous equation (1-2). Since the RGB data is treated as 8-bit data for each color, saturation processing is carried out to clip a value of 0 or lower to 0, and a value of 255 or higher to 255. Here, color space of the converted R1G1B1 data is treated as sRGB color space.

On the other hand, the Y'Cb'Cr' data is first converted into a predetermined XYZ value at a YCbCr→XYZ converting unit 408 at a color space converting unit 407, and then converted into R2G2B2 data of 16 bits for each color at an XYZ→RGB converting unit 409.

Here, as in the case of the previous embodiment, lookup tables are respectively created from color reproducing characteristics of the used input device 415 (digital still camera in the embodiment) for the conversion from the YCbCr data into the XYZ data, and the used printer for the conversion from the XYZ data into the RGB data. Then, each conversion is carried out by interpolation processing.

Thus, because of no execution of the saturation processing, color space of the R2G2B2 data is treated as expanded color space data capable of representing more colors than that of the sRGB color space.

In the described conversion, by treating R2, G2 and B2 as 16-bit data (equation 1-2), values from −32768 to 32768 can be taken when the YCbCr data is converted into the RGB data. An XYZ value may be obtained from sRGB data expanded according to definition of e-sRGB (PIMA 7667), and converted into R2G2B2 data as expanded color space data by using a predetermined lookup table.

The converted R1G1B1 data is sent through a drawing interface 410 to a display driver 411, and displayed on a display 412.

On the other hand, the R2G2B2 data is sent through the drawing interface 410 to a printer driver, and printed and outputted from a printer 414.

If a result of the analysis by the data analysis module 24 shows that the data read by the RGB/YCbCr reading unit 403 is RGB, the data is subjected to correction processing for brightness, contract, color balance or the like at the image correction processing unit 405, and converted into R0G0B0 data. A content of the correction processing is instructed through the user interface 404.

Here, color space of the R0G0B0 data is treated as sRGB color space.

The R0G0B0 data is sent through the drawing interface 410 to the display driver 411 and the printer driver 413, and displayed on the display 412, and printed and outputted from the printer 414.

Figure 5:
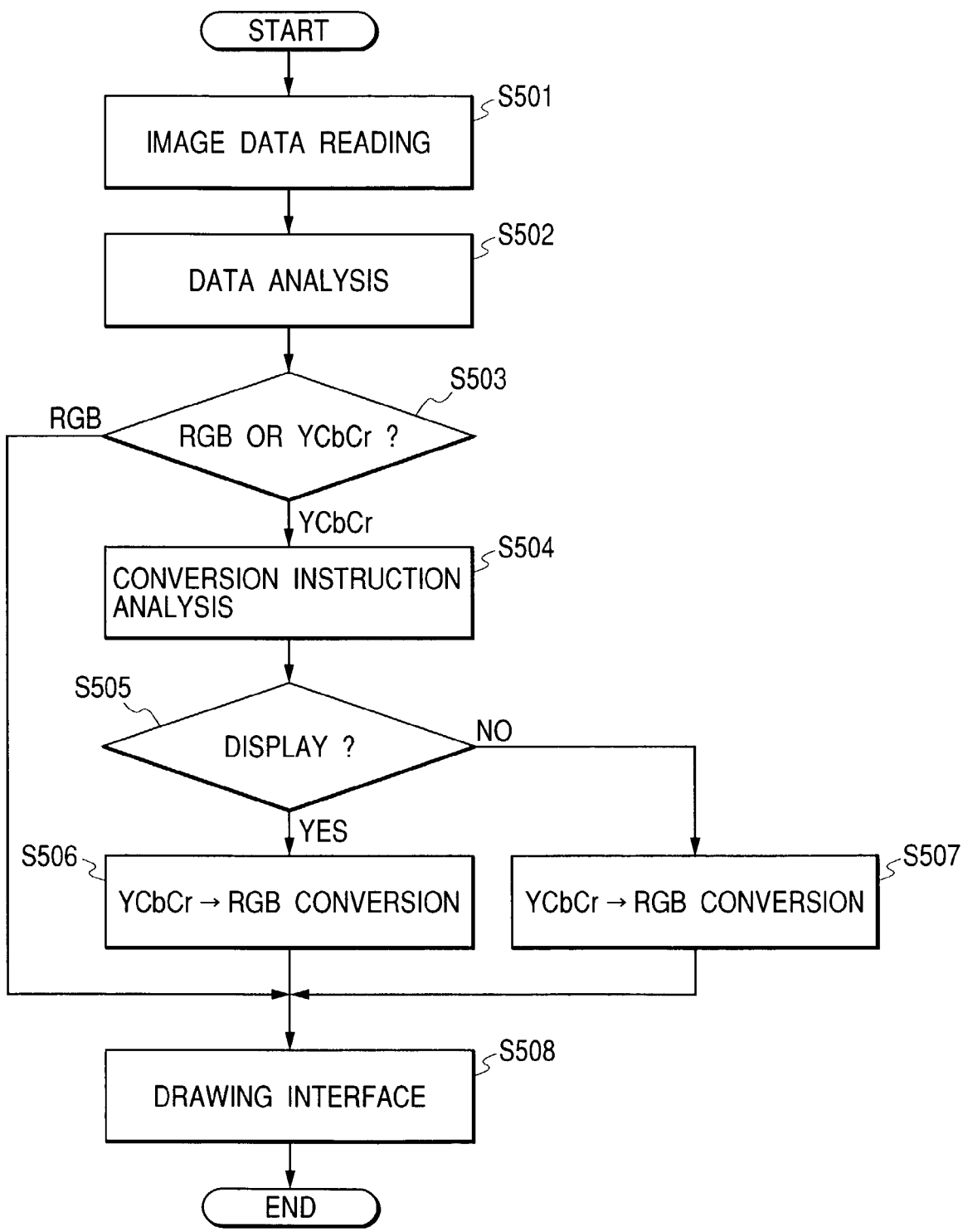
FIG. 5 is a flowchart showing a flow of the image data processing of the second embodiment.

FIG. 5 is a flowchart showing a flow of the image data processing of the second embodiment of the invention.

In step S501, image data is read by the file reading unit 402 and, in step A502, the data is analyzed at the data analysis module 24. In step S503, if a result of the analysis by the analysis module 24 shows that the image data is YCbCr data, the process proceeds to step S504, where conversion instruction from the application software side is analyzed. In step S505, determination is made as to whether the conversion instructed from the application software side is for displaying on the display or not. If it is for displaying on the display, in step S506, the image data is converted into RGB data for displaying on the display, and the data is sent to the drawing interface of step S508. If it is not for displaying on the display, determining that it is for the printer, the data is converted into RGB data in step S507, and then the data is sent to the drawing interface of step S508.

The conversion operations in steps S506 and S507 are respectively similar to the YCbCr→CRGB converting unit 406 and the color space converting unit 407.

If the image data is determined to be RGB data in step S503, the data is sent to the drawing interface of step S508.

If the foregoing converted image data is in a form of YCbCr data, as shown in FIG. 4, by using the R1G1B1 as the sRGB color space data for the display 412, and the R2G2B2 as the expanded color space data including a sufficient printer color reproducing area for the printer 414, image data can be used, which are suitable for the respective devices. A color characteristic of an original image can be outputted and reproduced by achieving good image displaying on the display and preventing any color omission in the printer.

If the image data is in a form of RGB data, displaying on the display 412 and an output to the printer 414 are both treated as sRGB color space data.

In the embodiment, color space definition of RGB data sent to the printer is different depending on whether the data read by the RGB/YCbCr reading unit 403 is RGB data or YCbCr data. Accordingly, the application software instructs color space to be used to the printer driver.

The invention is not limited to the foregoing embodiment, and various changed and modifications can be made without departing from the teachings.

For system configuration, a data processing function may be provided in the printer, and the foregoing data processing may be carried out in the printer, thereby eliminating the use of the personal computer. In this case, image data can be read through a memory card from a reader such as a card reader provided in the printer, or from the memory card or the built-in memory held by the input device such as a digital camera by connecting the input device such as a digital still camera to the printer through a cable, infrared data communication or radio communication.

If a simple liquid crystal monitor is mounted as a display on the printer while the data processing function is provided in the printer, for the foregoing processed image data, data used for displaying on the liquid crystal monitor and data used for printing can be treated as separate color space data.

The embodiment has been described by way of example, where the digital still camera is used as the input device. However, the embodiment is not limited to the digital still camera. For example, the embodiment can be applied to an input device such as a digital video camera, an image scanner, or s film scanner.

As discussed above in detail, a method and a system for converting image data can be provided, which are capable of displaying and printing a high-quality photographic image by displaying digital image data obtained by the input device such as a digital still camera, and converting the data into image data optimal for printing by the printer.

According to the embodiment, if information (color space information of image data, and information on a maker and a model name of the input device, to which the image file has been entered) is analyzed, and a result of the analysis shows that the data is predetermined image data, the image data of the image file can be converted into two types of different color space image data suitable for the printer and the display having different color reproducing areas.

In the embodiment, software for sequentially executing data processing operations can be realized.

That is, needless to say, the software can also be achieved by supplying a storage medium (or recording medium) recording a program code of the software for realizing the function of the embodiment to the system or the apparatus, and causing a computer (alternatively CPU or MPU) of the system or the apparatus to read the program code stored in the storage medium and execute it. In this case, the program code itself read from the storage medium realizes the function of the embodiment, and can be written various storage media such as a CD, an MD, a memory card and an MO storing the program code.

Needles to say, the invention includes not only the realization of the embodiment by executing the program code read by the computer, but also the realization of the embodiment by a part or all of real processing executed by the operating system (OS) working on the computer based on the program code.

The program code read from the storage medium is written in a function expansion card inserted into the computer or a memory provided in a function expansion unit connected to the computer and, then, based on instruction of the program code, a CPU or the like provided in the function expansion card or the function expansion unit executes a part or all of real processing, thereby achieving the function of the embodiment. Needless to say, this case is also within the invention.

What is claimed is:

1. A data processing method, comprising the steps of:
reading image data;
determining a type of the read image data;
converting the image data into first color space data represented by a first number of bits;
converting the read image data into first color space data represented by a first number of bits if a result of the determination shows that the image data is data of a first predetermined type;
converting the read image data into device-independent color space data which is second color space data represented by a second number of bits larger than the first number of bits to represent a color reproducing area at least partially larger than that of the first color space data, if a result of the determination shows that the image data is data of a second predetermined type;
outputting the image to second outputting means by using the second color space data.

2. The data processing method according to claim 1, wherein the data of the second predetermined type is luminance and color-difference data.

3. An image data processing apparatus, comprising:
reading means for reading image data;
means for determining a type of the read image data;
first data converting means for converting the read image data into first color space data represented by a first number of bits if the determining means determines that the image data is data of a first predetermined type;
second data converting means for converting the read image data into device-independent color space data which is second color space data represented by a second number of bits larger than the first number of bits to represent a color reproducing area at least partially larger than that of the first color space data, if the determining means determines that the image data is data of a second predetermined type;
first outputting means for outputting an image to the first outputting means by using the image data converted by the first data converting means; and
second outputting means for outputting the image to the second outputting means by using the image data converted by the second data converting means.

4. The image data processing apparatus according to claim 3, wherein the data of the second predetermined type is luminance and color-difference data.

5. A computer-readable storage medium storing a program, in executable form, said program causing a computer to execute the steps of:
analyzing information added to an image file; and
selectively converting image data of the image file into either image data of different color reproducing areas of two types, or image data of a color reproducing area of one type, according to a result of the analysis,
wherein the two types include first image data, represented by a first number of bits, and second image data, represented by a second number of bits larger than the first number of bits, obtained by converting the image data into device-independent color space data and then converting it into the image data of color space having a color reproducing area at partially larger than that of the first image data, and
wherein the image data of the image file, before conversion, is data having a third number of bits per pixel, the third number being different from the first number and different from the second number.

6. A program, stored, in executable form, in a computer-readable storage medium, causing a computer to execute the steps of:
analyzing information added to an image file; and
selectively converting image data of the image file into either image data of different color reproducing areas of two types, or image data of a color reproducing area of one type, according to a result of the analysis,
wherein the two types include first image data, represented by a first number of bits, and second image data, represented by a second number of bits larger than the first number of bits, obtained by converting the image data into device-independent color space data and then converting it into the image data of color space having a color reproducing area at partially larger than that of the first image data, and
wherein the image data of the image file, before conversion, is data having a third number of bits per pixel, the third number being different from the first number and different from the second number.

7. An image data processing method comprising the steps of:
reading image data;
determining a type of the read image data;
converting the read image data into first color space data for display and for print and outputting the first color space data to a display device and to a printer, if a result of the determination shows that the image data is RGB data;
converting the read image data into first color space data represented by a first number of bits for display and outputting the first color space data to the display device, if a result of the determination shows that the image data is luminance and color-difference data; and
converting the read image data into device-independent data and then into second color space data which has a color reproducing area at least partially larger than that of the first color space data and which is represented by a second number of bits larger than the first number of bits and outputting the second color space data to the printer, if a result of the determination shows that the image data is luminance and color-difference data.

8. The data processing method according to claim 7, wherein the first color space data is sRGB and the second color space data is expanded color space data.

9. The data processing method according to claim 7, wherein the first color space is a standard color space of an operating system.

10. A computer-readable storage medium storing a program, in executable form, said program causing a computer to execute the steps of:

reading image data;

determining a type of the read image data;

converting the read image data into first color space data for display and for print and outputting the first color space data to a display device and to a printer, if a result of the determination shows that the image data is RGB data;

converting the read image data into first color space data represented by a first number of bit for display and outputting the first color space data to the display device, if a result of the determination shows that the image data is luminance and color-difference data; and converting the read image data into device-independent data and then into second color space data which has a color reproducing area at least partially larger than that of the first color space data and which is represented by a second number of bits larger than the first number of bits and outputting the second color space data to the printer, if a result of the determination shows that the image data is luminance and color-difference data.

11. The storage medium according to claim 10, wherein the first color space data is sRGB data and the second color space data is expanded color space data.

12. The storage medium according to claim 10, wherein the first color space is a standard color space of an operating system.

13. An image data processing apparatus, comprising:

means for reading image data;

means for determining a type of the read image data;

means for converting the read image data into first color space data for display and for print and outputting the first color space data to a display device and to a printer, if a result of the determination shows that the image data is RGB data;

means for converting the read image data into first color space data represented by a first number of bits for display and outputting the first color space data to the display device, if a result of the determination shows that the image data is luminance and color-difference data; and means for converting the read image data into device-independent data and then into second color space data which has a color reproducing area at least partially larger than that of the first color space data and which is represented by a second number of bits larger than the first number of bits and outputting the second color space data to the printer, if a result of the determination shows that the image data is luminance and color-difference data.

14. The image data processing method according to claim 13, wherein the first color space data is sRGB data and the second color space data is expanded color space data.

15. The image processing method according to claim 13, wherein a first color space is a standard color space of an operating system.

* * * * *

UNITED STATES PATENT AND TRADEMARK OFFICE
CERTIFICATE OF CORRECTION

| | |
|---|---|
| PATENT NO. | : 7,266,239 B2 |
| APPLICATION NO. | : 10/235758 |
| DATED | : September 4, 2007 |
| INVENTOR(S) | : Yuji Akiyama et al. |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 602 days Delete the phrase "by 602 days" and insert --by 649 days--.

COLUMN 1:

Line 66, "use" should read --the use of--.

COLUMN 2:

Line 3, "date" should read --data--.

COLUMN 3:

Line 53, "example" should read --example,--; and
Line 56, "s a" should read --as a--.

COLUMN 4:

Line 26, "create" should read --creates--; and
Line 28, "transfer" should read --transfers--.

COLUMN 5:

Line 10, "result" should read --results--; and
Line 23, "read a" should read --read by a--.

COLUMN 6:

Line 14, "changed" should read --changes--; and
Line 37, "s" should read --a--.

COLUMN 8:

Line 10, "YCbCr → CRGB" should read --YCbCr → RGB--;
Line 33, "changed" should read --changes--; and
Line 55, "or s" should read --or a--.

UNITED STATES PATENT AND TRADEMARK OFFICE
CERTIFICATE OF CORRECTION

PATENT NO. : 7,266,239 B2
APPLICATION NO. : 10/235758
DATED : September 4, 2007
INVENTOR(S) : Akiyama et al.

It is certified that error appears in the above-identified patent and that said Letters Patent is hereby corrected as shown below:

COLUMN 9:

Line 13, "can be written various" should read --can be written in various--;
Lines 35-36 should be deleted; and
Line 47, "type;" should read --type;
¶ outputting an image to first outputting means by using the first color space data; and--.

COLUMN 10:

Line 24, "at" should read --at least--; and
Line 44, "at" should read --at least--.

COLUMN 11:

Line 22, "bit" should read --bits--.

COLUMN 12:

Line 28, "method" should read --apparatus--;
Line 31, "method" should read --apparatus--; and
Line 32, "wherein a" should read --wherein the--.

Signed and Sealed this

Second Day of September, 2008

JON W. DUDAS
*Director of the United States Patent and Trademark Office*